(12) United States Patent
Swanson

(10) Patent No.: US 11,406,088 B2
(45) Date of Patent: *Aug. 9, 2022

(54) SYSTEMS AND METHODS FOR TREATMENT AND FILTRATION OF WATER

(71) Applicant: Koi Acres LLC, Scandia, MN (US)

(72) Inventor: Mike Swanson, Scandia, MN (US)

(73) Assignee: Koi Acres LLC, Scandia, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,472

(22) Filed: Dec. 18, 2019

(65) Prior Publication Data

US 2020/0120906 A1 Apr. 23, 2020

Related U.S. Application Data

(63) Continuation of application No. 15/916,175, filed on Mar. 8, 2018, now Pat. No. 10,542,732.

(60) Provisional application No. 62/468,778, filed on Mar. 8, 2017.

(51) Int. Cl.
*A01K 63/04* (2006.01)
*B01D 33/11* (2006.01)
(Continued)

(52) U.S. Cl.
CPC .............. *A01K 63/04* (2013.01); *B01D 33/11* (2013.01); *C02F 1/001* (2013.01); *C02F 9/00* (2013.01);
(Continued)

(58) Field of Classification Search
CPC ...... A01K 63/045; A01K 63/04; A01K 63/00; B01D 24/007; B01D 24/263; B01D 33/11;
(Continued)

(56) References Cited

U.S. PATENT DOCUMENTS 5,228,999 A * 7/1993 Yang ................... A01K 63/045
210/615
6,843,910 B1 1/2005 Thomas
(Continued)

FOREIGN PATENT DOCUMENTS

GB 2248558 A * 4/1992 ........... A01K 63/045
GB 2538818 A 11/2016

OTHER PUBLICATIONS

Aquaking Red Label; Red Label Aquaking—Red Label Filter Series Product Catalog; 2017; 24 pages.
(Continued)

*Primary Examiner* — Claire A Norris
(74) *Attorney, Agent, or Firm* — Merchant & Gould P.C.

(57) ABSTRACT

A water treatment system for a water reservoir comprises a collection box; a rotary drum filter arranged to receive gravity flow from the collection box through a receiving line; a primary bio-filter; a secondary bio-filter; one or more connecting lines originating at the rotary drum filter and comprising at least a first outlet line connected to the primary bio-filter and a second outlet line connected to the secondary bio-filter, the second outlet line comprising a pump; and a return line originating at the primary bio-filter and terminating at the water reservoir. The collection box has a bottom and sides defining an interior volume, and comprises a first water intake having a first riser; a second water intake having a second riser; and a third water intake having a third riser, each riser being disposed inside the interior volume and extend upwardly from the bottom of the collection box.

25 Claims, 15 Drawing Sheets

(51) Int. Cl.
  *C02F 1/00* (2006.01)
  *C02F 9/00* (2006.01)
  *C02F 103/20* (2006.01)
  *C02F 101/38* (2006.01)

(52) U.S. Cl.
  CPC ...... *C02F 2101/38* (2013.01); *C02F 2103/20* (2013.01)

(58) Field of Classification Search
  CPC .......... B01D 24/266; C02F 1/001; C02F 9/00; C02F 3/00; C02F 2103/20
  USPC ........... 210/170.09, 167.01, 170.02; 119/259
  See application file for complete search history.

(56) References Cited

U.S. PATENT DOCUMENTS

| | | | | |
|---|---|---|---|---|
| 7,462,284 | B2* | 12/2008 | Schreier | C02F 3/345 |
| | | | | 210/605 |
| 10,694,722 | B1* | 6/2020 | Holm | A01K 63/047 |
| 2006/0191828 | A1* | 8/2006 | Cummins | B01D 33/48 |
| | | | | 210/97 |
| 2010/0031893 | A1* | 2/2010 | Bodlovich | C02F 3/32 |
| | | | | 119/227 |
| 2015/0305313 | A1* | 10/2015 | Licamele | A01G 22/15 |
| | | | | 119/204 |

OTHER PUBLICATIONS

Koiphen the Official Chatboard of the WWKC; Forum regarding Deepwater Koi's Gravity Fed Zakki Shower; 2017; 20 pages.
ProfiDrum; ProfiDrum Rotary Drum Filters; Mar. 17, 2017; 3 pages.
Koi Acres; Koi Pond Construction; Apr. 12, 2017; 4 pages.
ProfiDrum; ProfiDrum Solutions—Products for mechanical and biological filtration; Jun. 7, 2017; 2 pages.
ProfiDrum; Welcome to ProfiDrum—Manufacturer of innovative products in the field of water purification; Jun. 18, 2017—2 pages.
ProfiDrum; ProfiDrum Welcome; Oct. 12, 2017; 2 pages.
Koi Acres; Imported Japanese Koi & Online Shopping for Koi food, Filtration Equipment; Dec. 21, 2017; 6 pages.

* cited by examiner

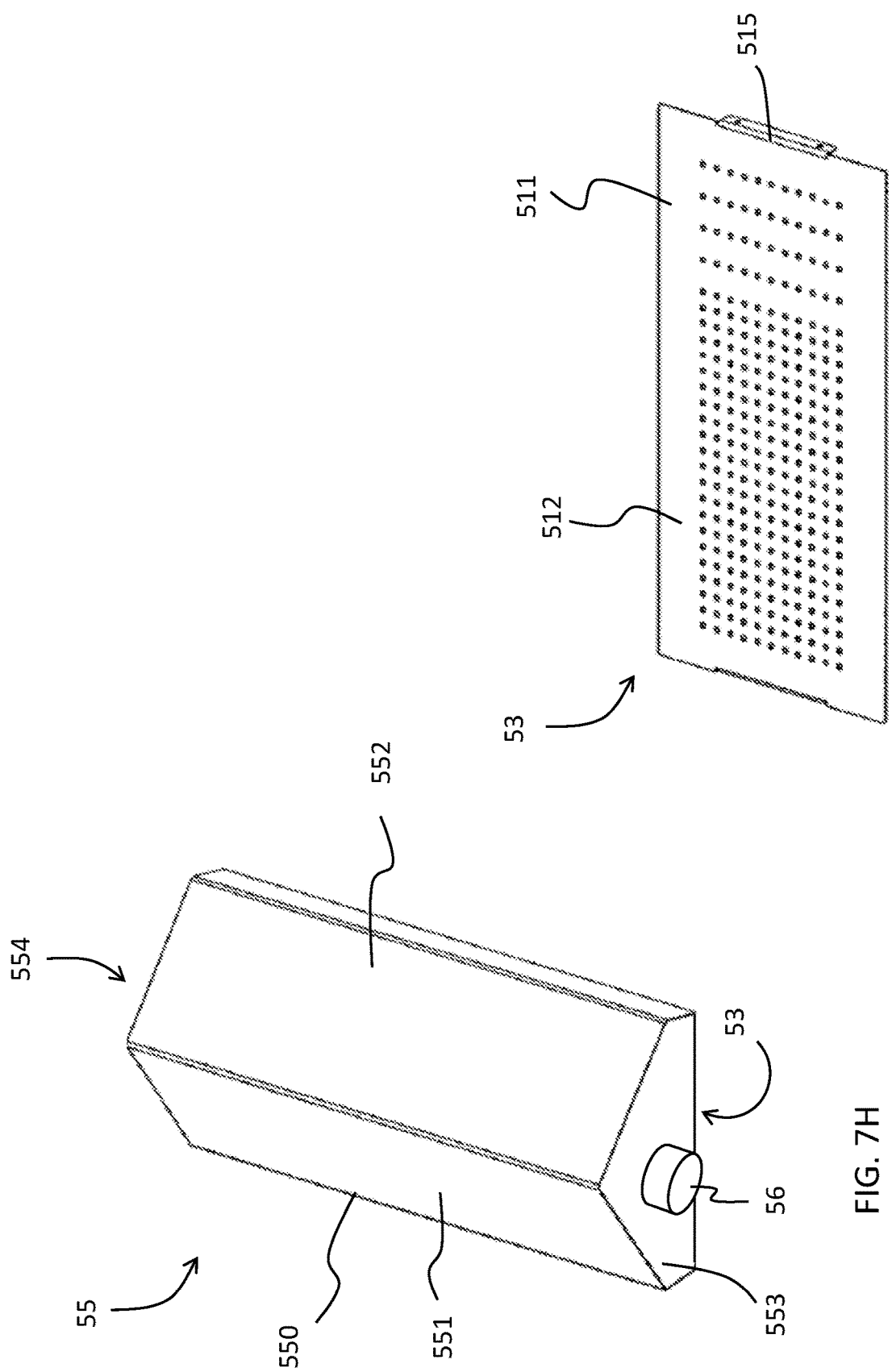

SYSTEMS AND METHODS FOR TREATMENT AND FILTRATION OF WATER

CROSS REFERENCE TO RELATED APPLICATIONS

This application is a continuation of U.S. patent application Ser. No. 15/916,175 filed on Mar. 8, 2018, which claims priority to U.S. Provisional Application No. 62/468,778, filed on Mar. 8, 2017, entitled SYSTEMS AND METHODS FOR TREATMENT AND FILTRATION OF WATER, the disclosures of which are hereby incorporated by reference in their entireties. To the extent appropriate a claim of priority is made to each of the above-disclosed applications.

FIELD

The present disclosure relates to water treatment and filtration systems and methods for ponds and aquaculture systems.

BACKGROUND

Water in aquariums, ponds, and aquaculture systems needs to be filtered and treated to maintain adequate water quality for the intended use. Outdoor ponds typically require removal of coarse debris, such as leaves, sand, dirt, and other impurities that may enter the water from the environment. Various uses impose different water quality needs, such as a certain level of microbial quality, organic matter, chemical purity, pH, turbidity or clarity, color, etc. It may also be desirable to use a system that provides a high flow rate through the treatment system while producing minimal noise and distraction of the water in the pond or tank. It is against this background that the present disclosure is made.

SUMMARY

A water treatment system for a water reservoir comprises a collection box having a bottom and sides defining an interior volume, the collection box comprising: a first water intake having a first riser connected to a first pipe in fluid communication with a skimmer on the water reservoir; a second water intake having a second riser connected to a second pipe in fluid communication with an outlet positioned in a mid-section of the water reservoir; and a third water intake having a third riser connected to a third pipe in fluid communication with an outlet positioned at a bottom of the water reservoir, wherein the first, second, and third risers are disposed inside the interior volume and extend upwardly from the bottom of the collection box; a rotary drum filter arranged to receive gravity flow from the collection box through a receiving line; a primary bio-filter; one or more connecting lines originating at the rotary drum filter and comprising at least a first outlet line connected to the primary bio-filter; and a return line originating at the primary bio-filter and terminating at the water reservoir.

A water treatment system for a water reservoir comprises a collection box; a rotary drum filter arranged to receive gravity flow from the collection box through a receiving line; a primary bio-filter; a secondary bio-filter; one or more connecting lines originating at the rotary drum filter and comprising at least a first outlet line connected to the primary bio-filter and a second outlet line connected to the secondary bio-filter, the second outlet line comprising a pump; and a return line originating at the primary bio-filter and terminating at the water reservoir. The collection box has a bottom and sides defining an interior volume, and comprises a first water intake having a first riser connected to a first pipe in fluid communication with a skimmer on the water reservoir; a second water intake having a second riser connected to a second pipe in fluid communication with an outlet positioned in a mid-section of the water reservoir; and a third water intake having a third riser connected to a third pipe in fluid communication with an outlet positioned at a bottom of the water reservoir. The first, second, and third risers are disposed inside the interior volume and extend upwardly from the bottom of the collection box.

BRIEF DESCRIPTION OF DRAWINGS

FIG. 7H is a perspective view of a roof assembly of the bakki shower of FIG. 7A.

FIG. 7I is a perspective view of a diffuser plate of the roof assembly of FIG. 7H.

DETAILED DESCRIPTION

The present disclosure relates to water treatment and filtration systems and methods for ponds and aquaculture systems.

The term "about" is used here in conjunction with numeric values to include normal variations in measurements as expected by persons skilled in the art, and is understood to have the same meaning as "approximately" and to cover a typical margin of error, such as ±5% of the stated value.

The term "gravity flow" is used here to refer to flow of water or aqueous media unassisted by a pump.

Water in aquariums, ponds, and aquaculture systems needs to be filtered and treated to maintain adequate water quality for the intended use. Various uses impose different water quality needs, such as a certain level of microbial quality, organic matter, chemical purity, pH, $CO_2$ removal, turbidity or clarity, color, etc. Outdoor ponds typically require removal of coarse debris, such as leaves, sand, dirt, and other impurities that may enter the water from the environment. The water may be treated to remove small contaminants and organic matter, algae and microbes, and may further be condition to oxygenate the water.

Certain types of uses of ponds or tanks, such as fish ponds and aquaculture ponds, may require a relatively high and consistent water quality. One example of such ponds is a koi fish pond. Koi are a variety of carp that originate in Asia and are often kept in outdoor ponds for decorative purposes. While koi are a hardy species and prefer water temperatures below about 77° F. (about 25° C.), they do not thrive at temperatures below about 60° F. (about 10° C.). Therefore, koi ponds are often quite deep (e.g., from about 5 to about 10 ft) to provide an adequate volume of water and a more steady temperature of water in deeper parts of the pond. Because koi are typically kept for their esthetic value, it is preferred that the water in a koi pond is clear and colorless. Good microbial quality, oxygenation, and suitable pH are also important for the health of the fish.

Koi ponds can be sized based on the size of the fish. For example, for smaller koi about 300 gal per fish may be sufficient, whereas large show-quality koi can be allocated as much as 1,000-1,200 gallons of water per fish. With pond depths ranging from about 4 to about 10 feet, pond volumes can range from about 4,000 gallons to about 15,000 gallons or even higher.

Figure 1:
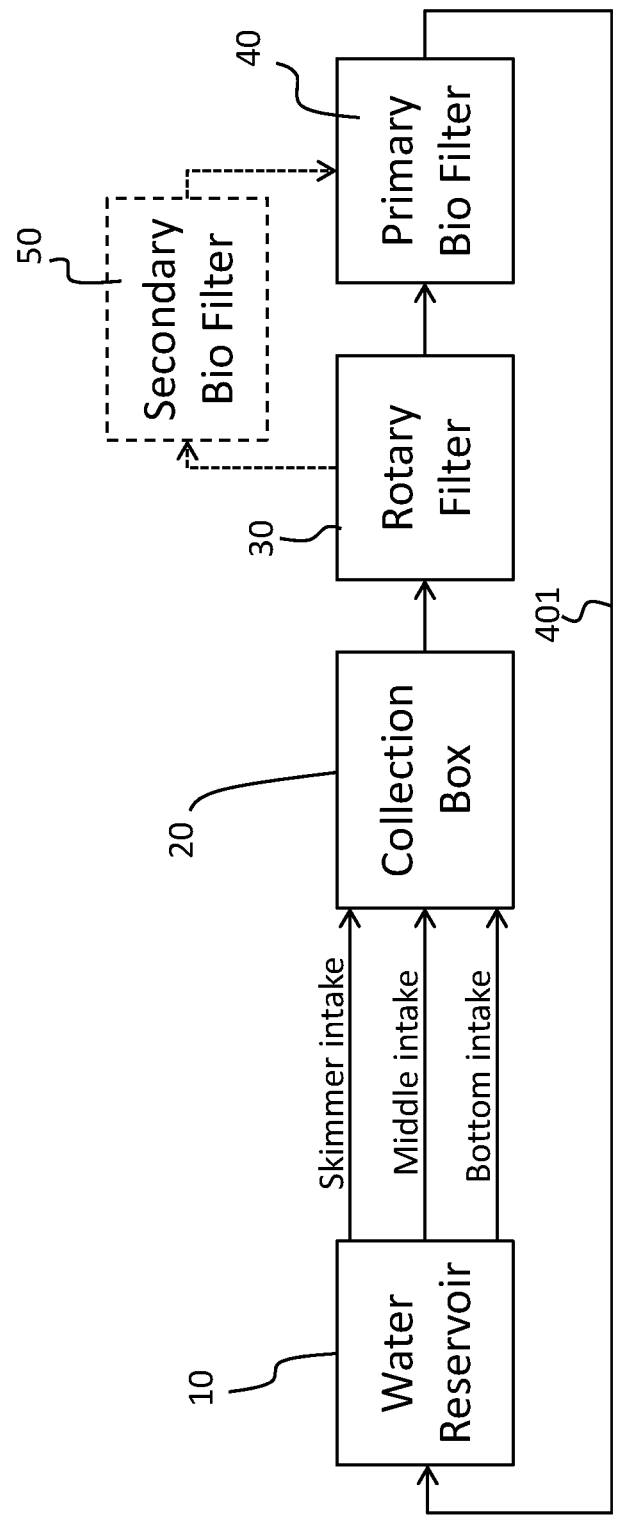
FIG. 1 is a schematic flow diagram of a system and method according to an embodiment.

The present disclosure relates to filtration systems and methods that can be used to maintain water quality in various ponds, tanks, aquaculture systems, etc., including koi ponds. A schematic flow diagram of a system and method according to the present disclosure is shown in FIG. 1. The system 1 includes a water reservoir 10 (e.g., a pond or a tank) and a filtration system 2 that may include a collection box 20, a rotary drum filter 30, a primary bio-filter 40, and a secondary bio-filter 50. The system 1 may be a substantially closed system, where each of the components of the system is in fluid communication with the other components. Water is drawn from the reservoir 10 into the collection box 20 through a skimmer intake 111, a middle intake 112, and a bottom intake 113. The collection box 20 acts to gather water flows from the different intake points for feeding into the rotary drum filter 30, and to capture any coarse solid impurities that may be present in the water. The rotary drum filter 30 is used to filter out smaller particles, and the primary and secondary bio-filters 40, 50 are used for filtration and to aerate and oxygenate the water. Water is returned back into the water reservoir 10 from the primary and secondary bio-filters 40, 50. In some embodiments, the system only includes the primary bio-filter 40. However, including a secondary bio-filter 50 that may be of a different type than the primary bio-filter 40, may further increase the amount of dissolved oxygen in the water and increase biofiltration of the system.

Figure 2:
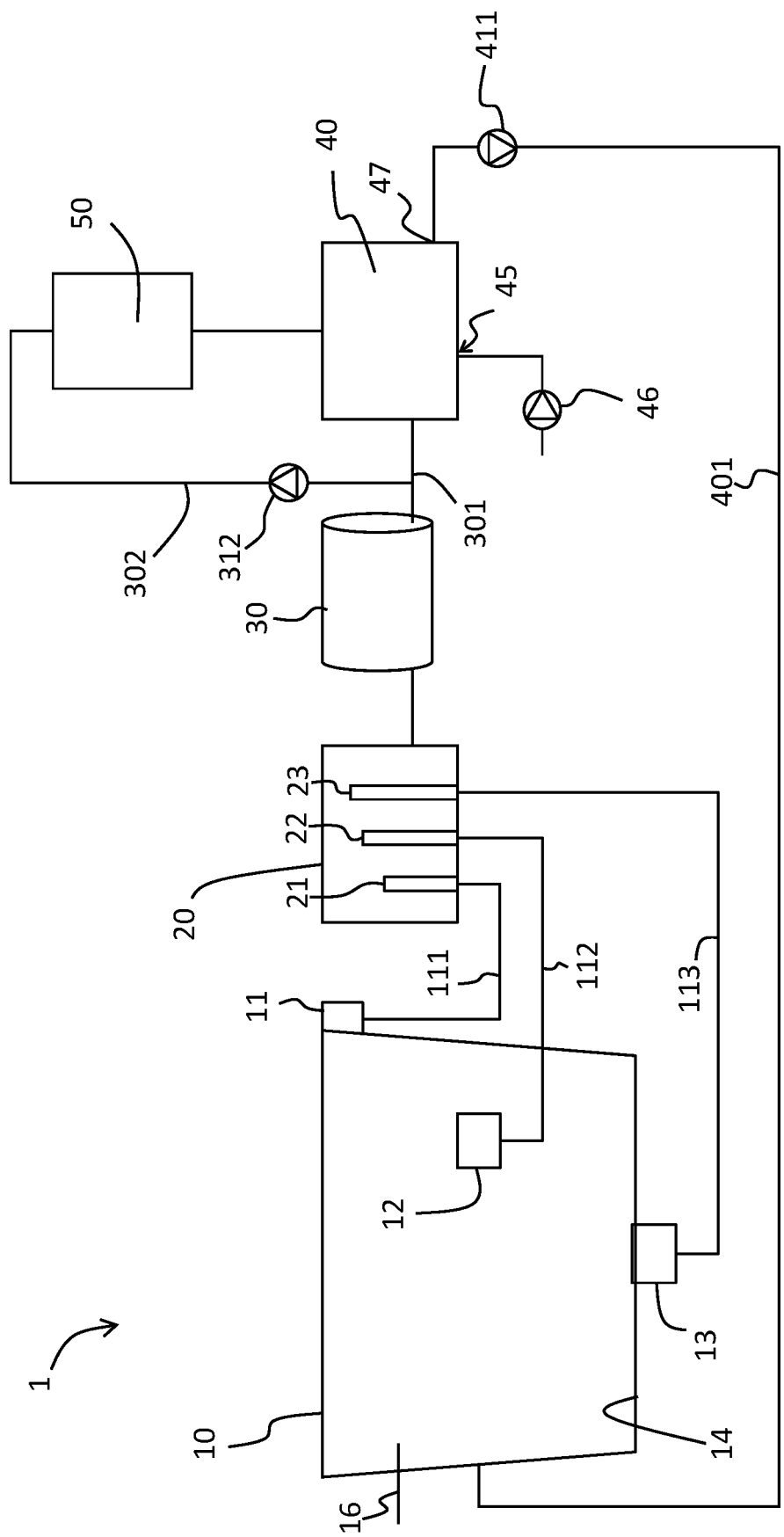
FIG. 2 is a schematic side view of a water treatment system according to an embodiment.
Figure 3:
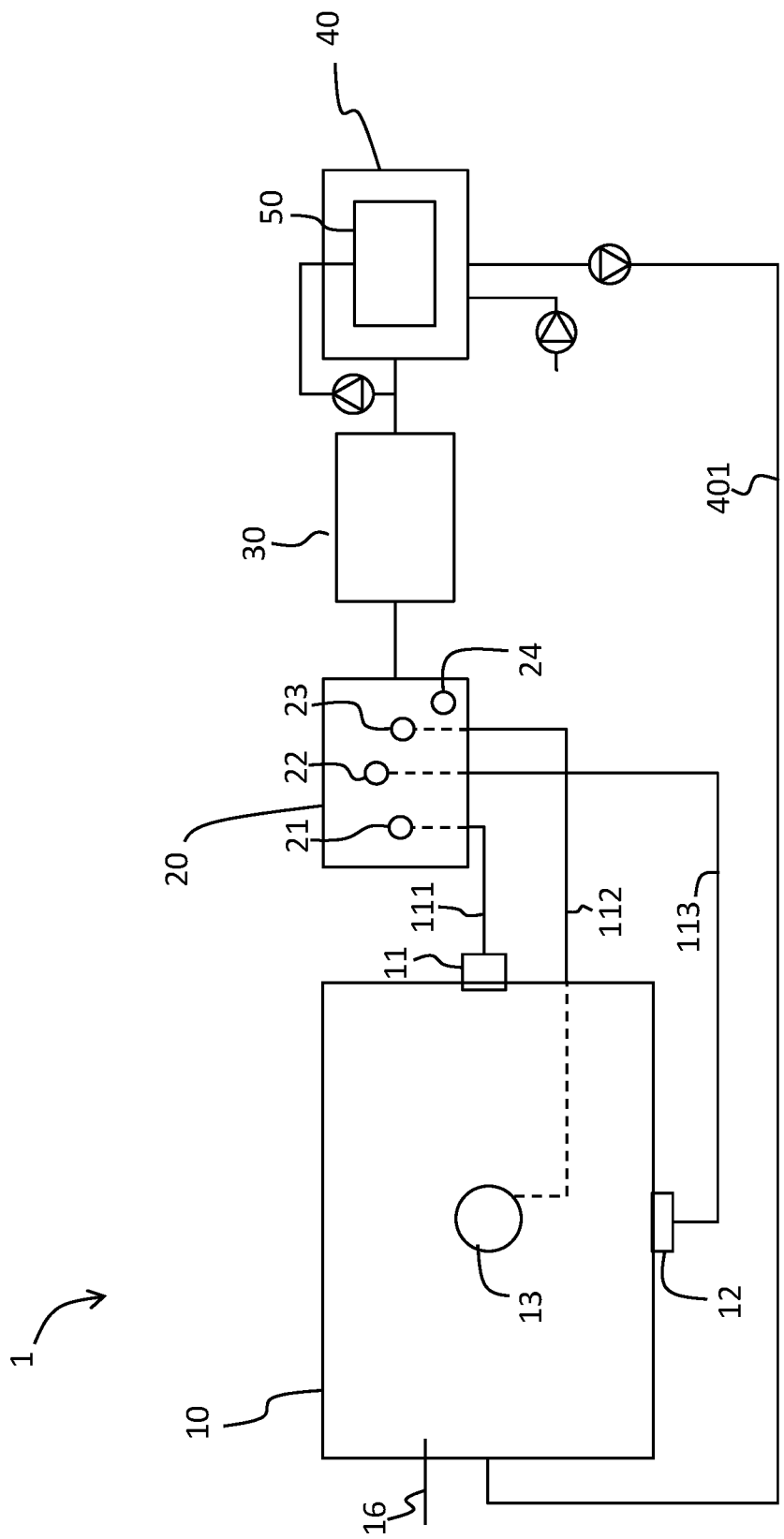
FIG. 3 is a schematic top view of the water treatment system of FIG. 2.

FIGS. 2 and 3 are schematic system flow diagrams according to an embodiment of the present disclosure. The water reservoir 10 is depicted as a fish pond. The water reservoir may include a water inlet 16 for filling and make-up water. The water intake may be connected to any suitable water source, such as a municipal water line. The intake of make-up water can be controlled with a valve, and may be adjusted to account for any water losses during the operation of the system. The water reservoir 10 may have any suitable dimensions, such as a depth of about 2 to about 20 feet, about 3 to about 15 feet, about 4 to about 10 feet, or about 6 to about 8 feet; and a volume of about 1,000 to about 100,000 gallons, about 2,000 to about 50,000 gallons, about 4,000 to about 25,000 gallons, or about 6,000 to about 15,000 gallons. The water reservoir 10 can be at least partially embedded in the ground such that the water level in the water reservoir 10 is near or at ground level. The water reservoir 10 may have a bottom and walls constructed of any suitable material, such as concrete, stone, ceramic, fiberglass, plastic, or a combination thereof. In an upper section of the water reservoir 10, near an intended water line, the water reservoir 10 includes one or more skimmers 11 for skimming surface water and floating impurities. In an example embodiment, the one or more skimmers 11 include a movable door that shifts from pressure applied on it by water flow through the water reservoir 10. In one example embodiment, a foam pad is positioned behind the skimmer door to enable the door to move upon pressure applied by water flowing through the water reservoir 10. The skimmers 11 are connected to one or more skimmer intakes 111 leading into the collection box 20. The skimmers 11 may include a weir door and/or a grate to prevent fish from entering the skimmer intake 111.

Figure 8B:
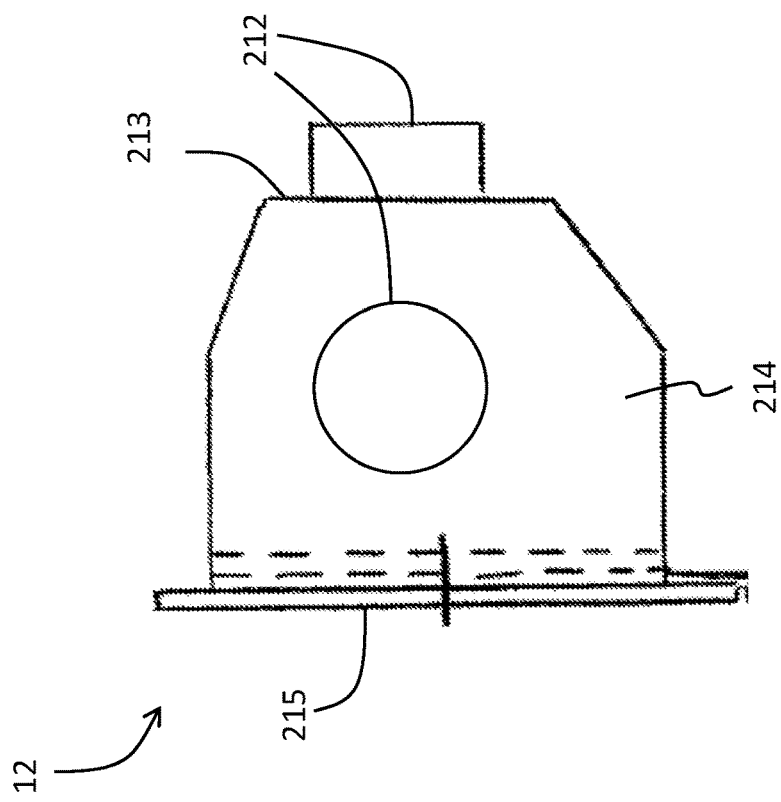
FIG. 8B is a side view of the wall drain of FIG. 8A.
Figure 8A:
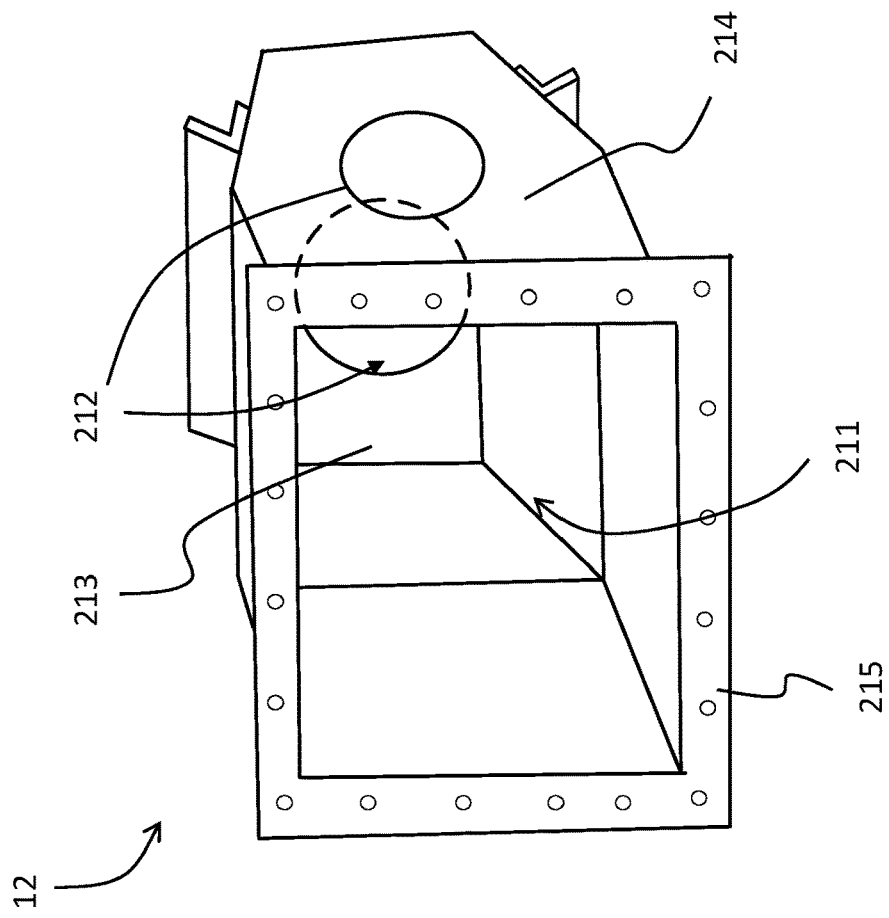
FIG. 8A is a perspective view of a wall drain used in the system of FIG. 2 according to an embodiment.

The water reservoir 10 may further include at least one wall drain 12 that directs water into the middle intake 112. An exemplary design of the wall drain 12 is shown in FIGS. 8A and 8B. The wall drain 12 may include a back wall 213 and side walls 214 defining a cavity 211, a face plate 215 surrounding a front opening, and one or more outlets 212 positioned on the back wall 213 or side walls 214 of the wall drain 12. When the wall drain 12 is installed, one or more of the outlets 212 can be connected to the middle intake 112 based on the most convenient flow path, and any remaining outlets 212 can be capped. A most convenient flow path is one with the least number of turns in the line that could lower the flow rate in the line and make cleaning more difficult. Accordingly, the wall drain 12 can be positioned inside a wall of the water reservoir 10, allowing the middle intake 112 to be connected to the wall drain 12 in multiple orientations (e.g., an upward, downward, left, or right orientation). Thus, the multiple outlets provide at least five different options to connect to the collection box 20 via the middle intake 112. The face plate 215 may be used to attach the wall drain 12 to a wall of the water reservoir 10.

The wall drain 12 can be positioned at any location on a wall of the water reservoir 10. However, preferably the wall drain 12 is positioned in at or near a midpoint of the water height in the water reservoir 10. For example, if the water reservoir 10 is designed for a water depth of about 8 feet, the wall drain 12 can be positioned about 4 feet from the bottom of the water reservoir 10. Drawing water from the water reservoir 10 through a wall drain 12 positioned near the midpoint of the water depth improves water mixing in the water reservoir 10 and helps avoid dead zones where harmful bacteria could colonize.

Figure 9A:
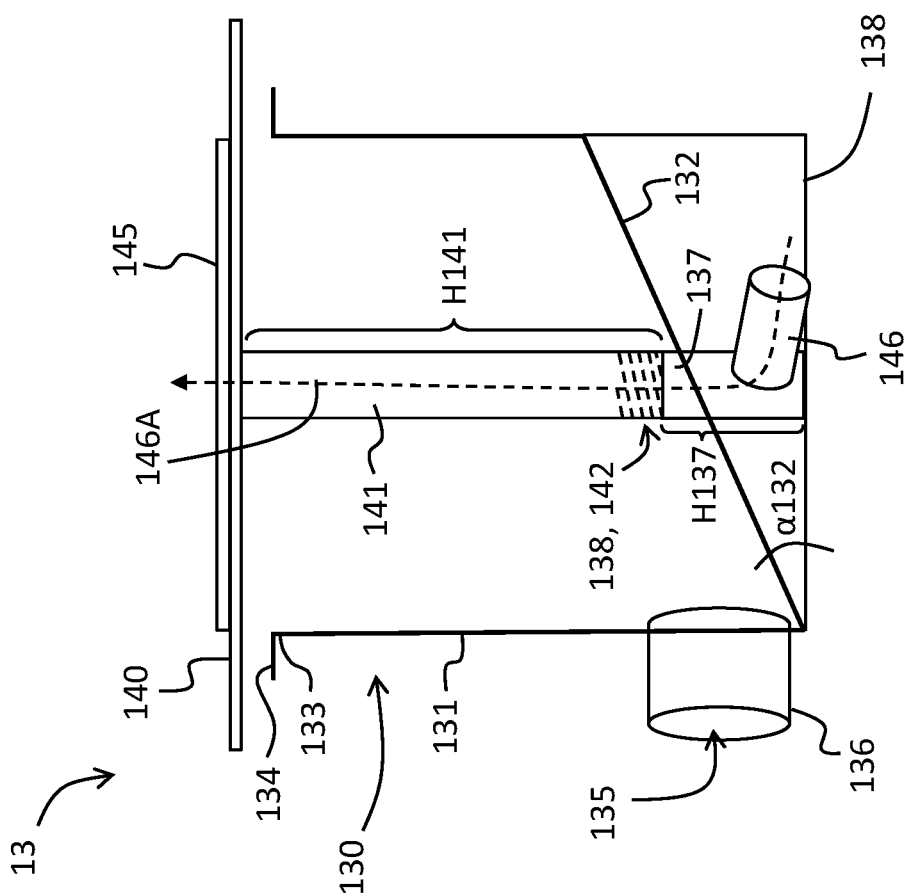
FIG. 9A is a cross sectional side view of a bottom drain used in the system of FIG. 2 according to an embodiment.
Figure 9C:
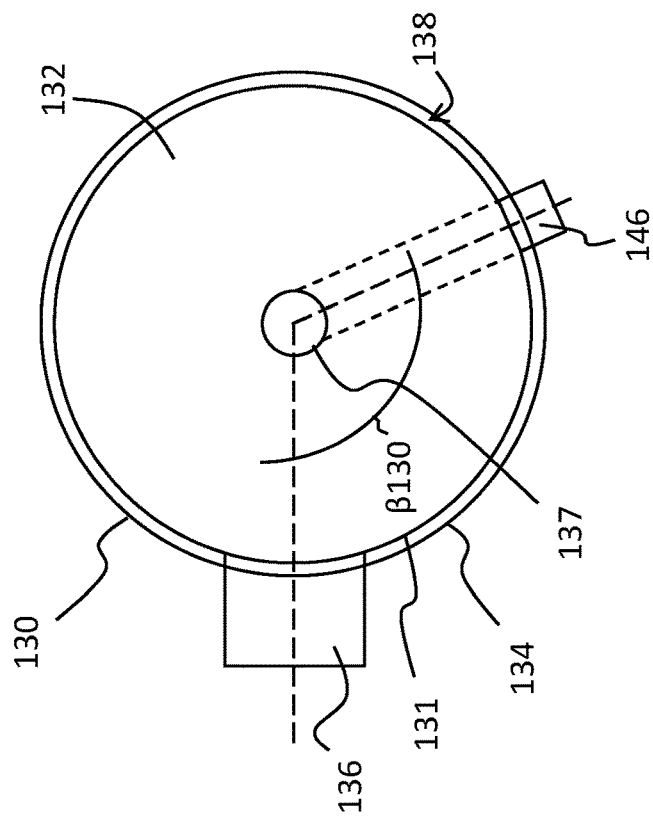
FIG. 9C is a top view of a receiving portion of the bottom drain of FIG. 9A.
Figure 9B:
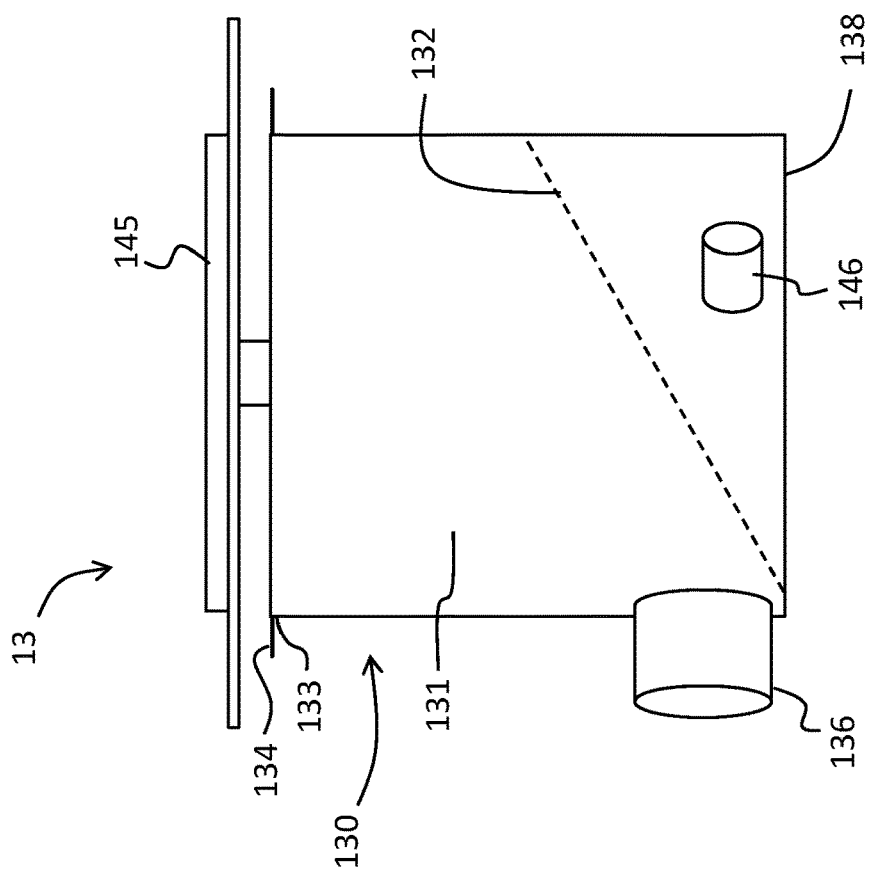
FIG. 9B is a side view of the bottom drain of FIG. 9A.

The water reservoir 10 also includes at least one bottom drain 13 that directs water into the bottom intake 113. An exemplary design of a bottom drain 13 according to an embodiment is shown in FIGS. 9A-9C. The bottom drain 13 preferably includes a lid that prevents fish from entering the bottom intake 113 but that lets water and debris to flow through the drain.

The skimmers 11, wall drain 12, bottom drain 13, skimmer intake 111, middle intake 112, and bottom intake 113 may be sized so that approximately equal volumes of water are drawn from each section (top, middle, and bottom) of the water reservoir 10. In one exemplary embodiment, the lines used for the skimmer, middle, and bottom intakes 111, 112, 113 are 2 to 6 inch diameter, for example 4-inch diameter, PVC pipe or similar. Water flow from the water reservoir 10 to the collection box 20 can be arranged as gravity flow. Total flow rate through the skimmer, middle, and bottom intakes 111, 112, 113 may be from about 500 to about 20,000 gallons per hour, about 1,000 to about 18,000 gallons per hour, or about 4,000 to about 16,000 gallons per hour. The flow rates are given for a system that includes a single collection box, rotary filter, and primary and secondary bio-filter. However, the flow rate can be increased if the system includes multiple collection boxes, rotary filters, and bio-filters. Recommended turnover rates for aquariums and aquaculture ponds, including koi ponds, vary from about once every one to three hours. In some embodiments, the filtration system is sized to provide a turn-over rate of the water in the water reservoir of about once every 0.8 to 2 hours, or about once every hour. As will be described herein, the filtration system 2 relies on gravity to circulate water throughout the pond and also includes passive elements that do not require power to operate. As such, the disclosed filtration system is capable of lasting many years without requiring much maintenance, as is the case with current pond filtration systems.

As will be described in further detail herein, a pump (such as pump 411) may be positioned to return water from the filtration system 2 to the water reservoir 10 (also referred to as a pressurized return) to minimize or eliminate bubbles from entering into the water reservoir 10, which would otherwise occur in a non-pressurized return system. The existence of bubbles in the water reservoir 10 may destroy the serene environment of the water reservoir 10.

Figure 4:
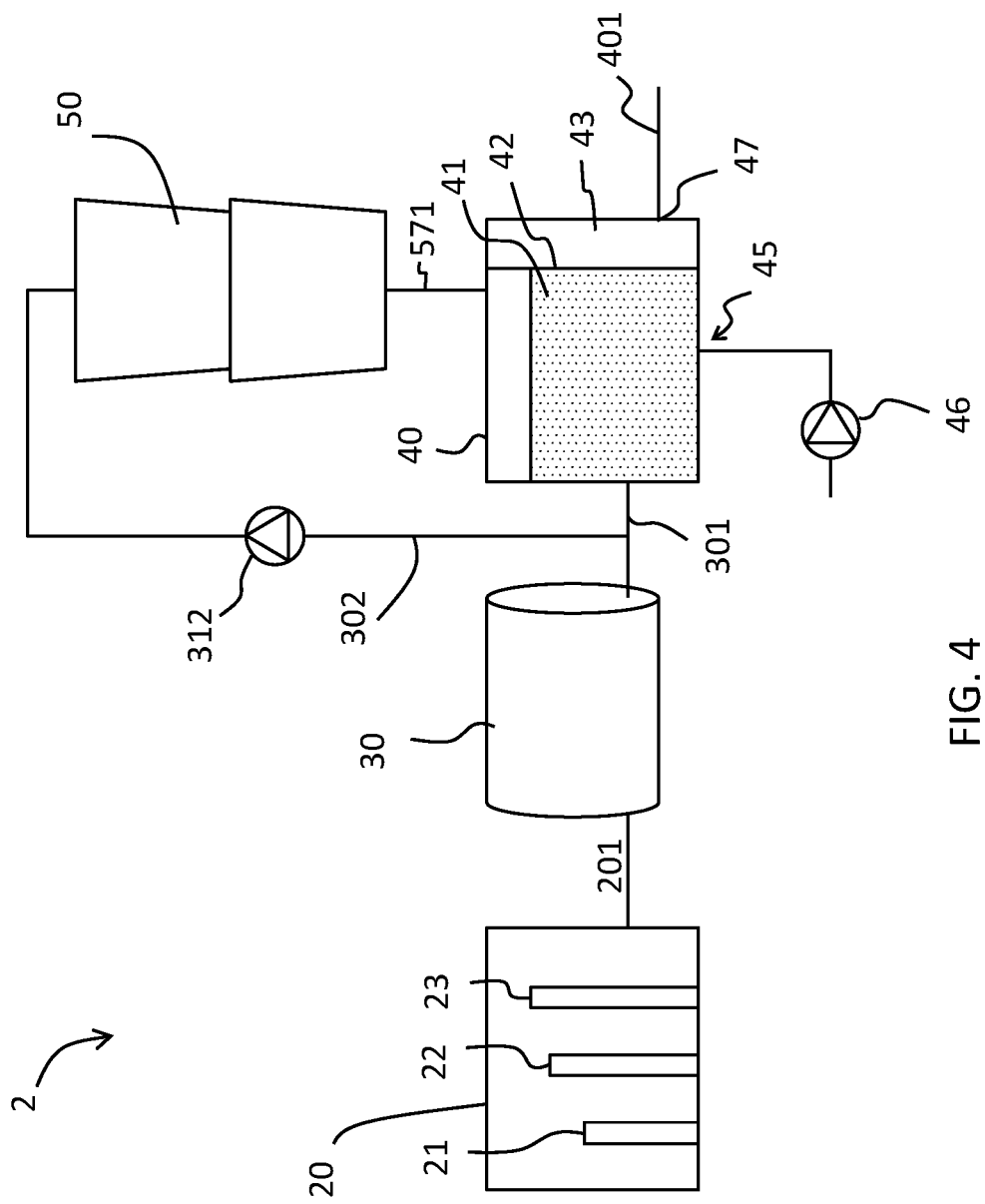
FIG. 4 is a schematic diagram of a filtration system of the water treatment system of FIG. 2 according to an embodiment.

The skimmer, middle, and bottom intakes 111, 112, 113 lead the water flow from the water reservoir 10 into a filtration system 2. The filtration system 2 is shown in further detail in FIG. 4.

Figure 5A:
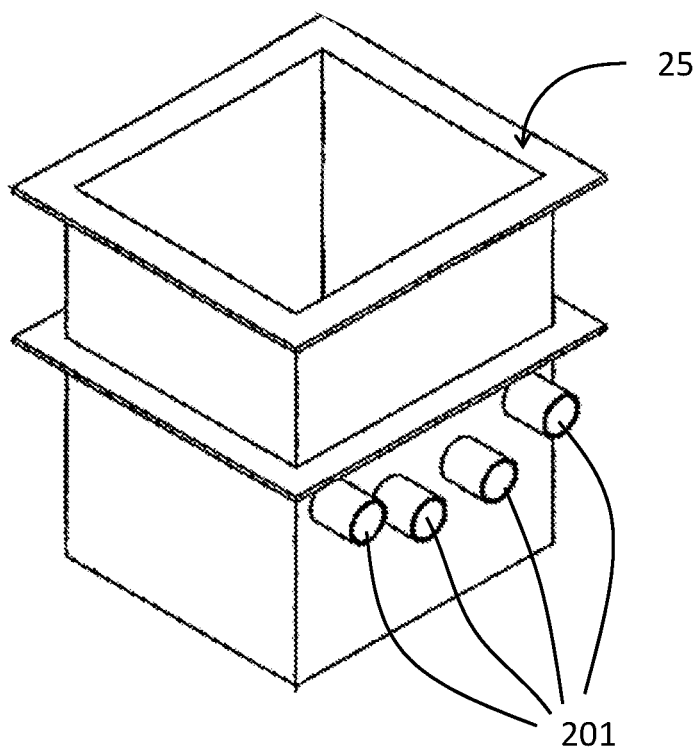
FIG. 5A is a perspective view of a collection box used in the system of FIG. 2 according to an embodiment.
Figure 5B:
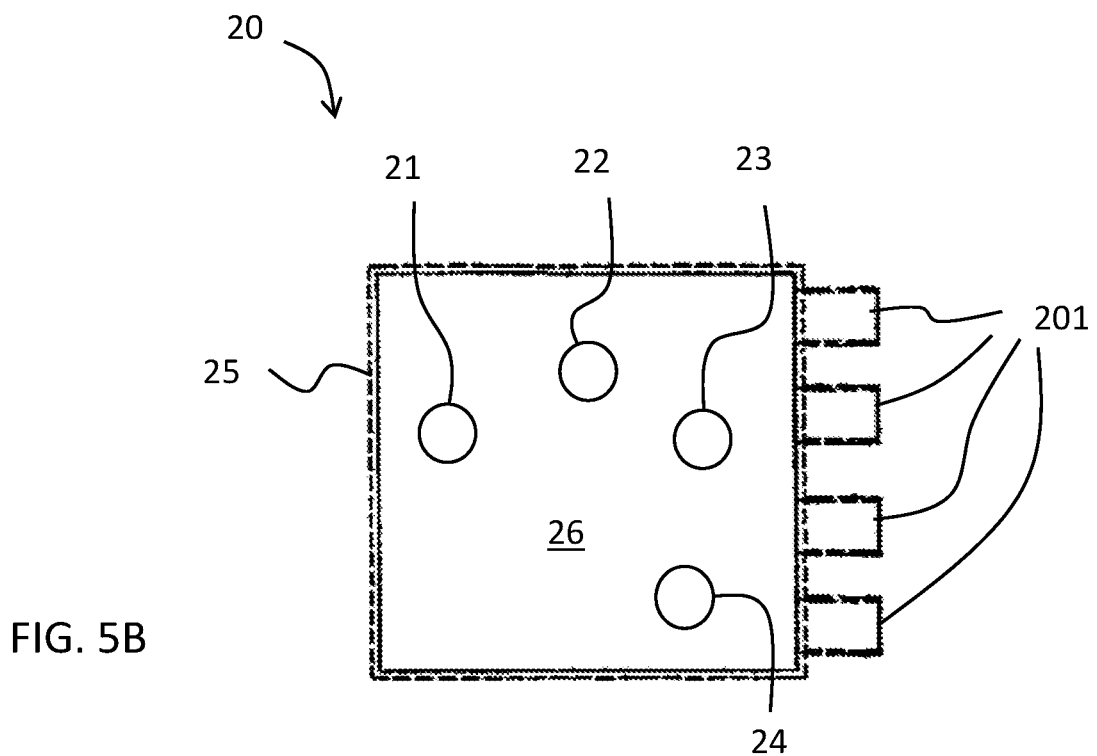
FIG. 5B is a top view of the collection box of FIG. 5A.
Figure 5C:
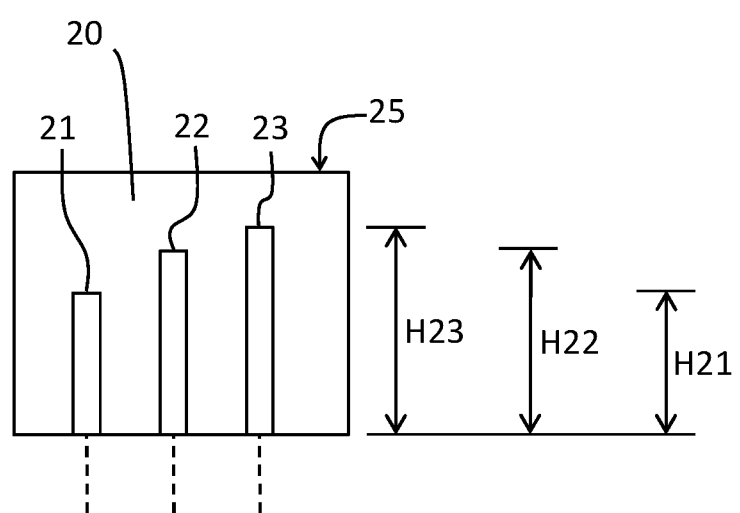
FIG. 5C is a cross sectional side view of the collection box of FIG. 5A.

The first component of the filtration system 2 is a collection box 20. An exemplary embodiment of a collection box is shown in FIGS. 5A-5C. The collection box 20 can be used to balance the incoming flows from the water reservoir and to capture any larger debris. In particular, the collection box 20 allows the multiple pond inputs (e.g., the skimmer intake 111, the middle intake 112, and the bottom intake 113) to be consolidated and balanced. The collection box 20 may also be used to flush the system to remove passive sediment that has been built up over time.

The skimmer, middle, and bottom intakes 111, 112, 113 lead the water flow from the water reservoir 10 into the collection box 20. Each of the intakes connects to an inlet at the bottom 26 of the collection box 20. The inlets may include risers (e.g., pipes) that extend from the inlets at the bottom of the collection box 20 upward and have an open top through which water can flow into the interior of the collection box 20. The bottom 26 of the collection box 20 may be fitted with bulkhead fittings that connect each intake line to a riser. The bulkhead fitting may include a bottom piece placed under the bottom 26 of the collection box 20 with a threaded portion extending through the bottom 26 and into the collection box 20, and a top piece placed inside the collection box 20 and threadingly coupled with the bottom piece. A rubber gasket can be included underneath the top piece to seal the connection. The risers can be friction-fitted onto the bulkhead fittings.

Alternatively, the risers may be connected to the collection box 20 via a slip fitting. The slip fitting enables a person to insert or remove the risers into or from the collection box 20 by simply sliding them in or out of the slip fitting without screwing in or out. An example of a suitable slip fitting is the BFA1040CFS 4" PVC bulkhead fitting, available from Hayward Flow Control of Clemmons, N.C. In some cases a threaded fitting may become stuck requiring a greater amount of force or even tools in order to dislodge the threaded connection, whereas a slip fitting can be installed and removed by hand without tools or excessive force being required. Furthermore, a riser may be removed and capped (closed). By capping one or more risers, flow is forced through one or more of the other uncapped risers, allowing the ability to flush the system with an increased flow of water.

The skimmer intake 111 connects to a first riser 21, the middle intake 112 connects to a second riser 22, and the bottom intake 113 connects to a third riser 23. The first riser 21 has a first height H21, the second riser 22 has a second height H22, and the third riser 23 has a third height H23. The first, second, and third heights H21, H22, and H23 are preferably lower than the upper edge 25 of the collection box 20. The collection box 20 may also include a drain 24.

The first, second, and third heights H21, H22, and H23 may also be different from one another. In one embodiment, the first height H21 is the shortest of the first, second, and third heights H21, H22, and H23. In one embodiment, the third height H23 is the tallest of the first, second, and third heights H21, H22, and H23. To stop water flow from the water reservoir into the collection box, a taller riser with a height extending above the water level in the water reservoir 10 can be inserted into the bulkhead fitting. Flow can be stopped from one, two, or all three intakes at a time. Stopping flow from only one or two intakes will increase water flow from the other risers/intakes. This can be used to clean any settled debris from the lines. Alternatively, flow can be stopped from all of the intakes at the same time so that the collection box and/or the filtration system 2 can be drained and cleaned.

The water level in the collection box 20 can be kept below the water level of the water reservoir 10 to facilitate gravity flow when the system is in operation. The first, second, and third heights H21, H22, and H23 of the risers 21, 22, 23 can be adjusted so that the open ends of the risers 21, 22, 23 are generally below the water level in the collection box 20.

The second component of the filtration system is a filter. Water flows from the collection box 20 to the filter through one or more connection lines 201. The filtration system is preferably arranged such that the water level in the filter is below the water level in the collection box 20 and the flow from the collection box 20 to the filter is gravity flow. In an alternative embodiment, the connection line 201 includes a pump.

In a preferred embodiment, the filter is a rotary drum filter 30. The rotary drum filter 30 is arranged to filter out particulates from the water. For example, the rotary drum filter 30 may have a screen size of about 10 to about 100 μm, about 20 to about 80 μm, or about 50 to about 70 μm. The rotary drum filter 30 may include a cleaning system that is capable of initiating a self-cleaning cycle when the filtration rate of the rotary drum filter 30 falls below a threshold value.

Figure 6A:
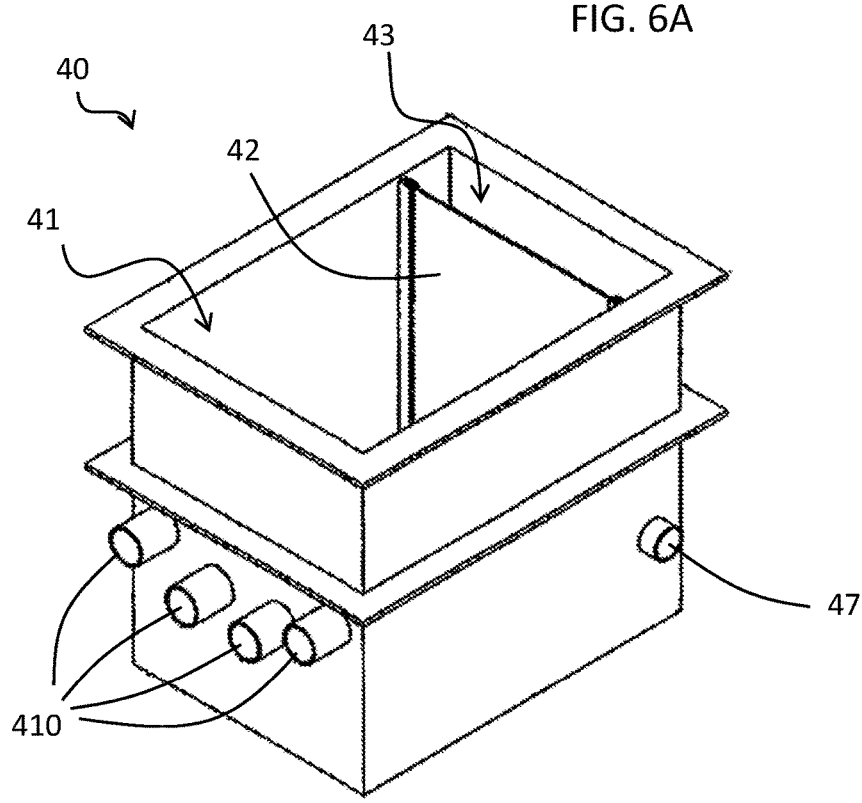
FIG. 6A is a perspective view of a bio-filter used in the system of FIG. 2 according to an embodiment.
Figure 6B:
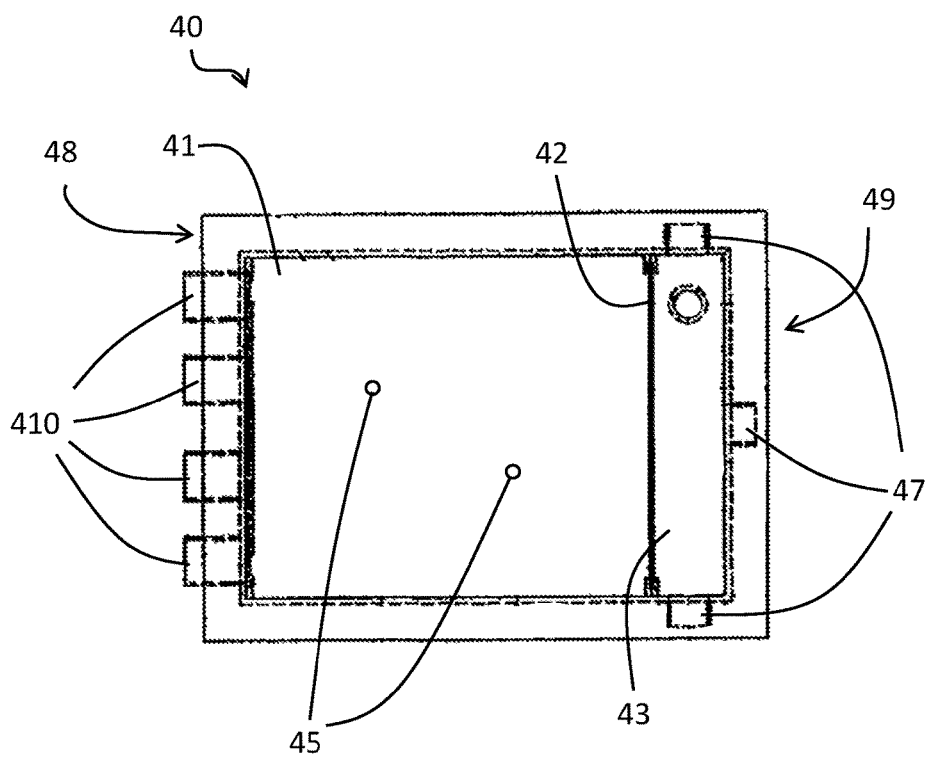
FIG. 6B is a top view of the bio-filter of FIG. 6A.

The filtration system 2 also includes a primary bio-filter 40. An exemplary embodiment of a primary bio-filter 40 is shown in FIGS. 6A-6C. Water from the rotary drum filter 30 flows into the primary bio-filter 40 through one or more connecting lines 301. In one embodiment, the flow from the rotary drum filter 30 to the primary bio-filter 40 is arranged as gravity flow. In an alternative embodiment, the connecting line 301 includes a pump. The primary bio-filter 40 provides a housing for a filter media that allows bacteria to colonize in the filter. The bacteria feed on and thereby remove organic matter (e.g., nitrogen-containing organic matter) in the water. An example of suitable filter media is a semi-buoyant polyethylene media MB3 WaterTek available from Water Management Technologies, Inc. in Baton Rouge, La. The primary bio-filter 40 may be divided into a main compartment 41 and a drainage compartment 43 by a wall 42. The wall 42 may comprise a screen that maintains the filter media on one side while allowing water to pass through, and prevents the filter media from getting into the outlet 47 or connected return line 401 that returns the treated water into the water reservoir 10.

The primary bio-filter 40 is outfitted with an aeration system to provide oxygen into the filter. The aeration system may include an aeration pump 46 and one or more air diffusers 45 at the bottom of the primary bio-filter 40. The air diffusers 45 may include a membrane (e.g., a rubber membrane) and a check valve that prevents water in the filter from entering the line from the aeration pump 46. The air flow rate from the aeration system can be arranged at a suitable level to keep the filter media in the bio-filter in constant motion, and to provide oxygen to the bacteria colonized on the filter media.

In some embodiments the primary bio-filter 40 includes a leaf guard to prevent undesirable outside material or animals from getting into the primary bio-filter 40. In some embodiments the leaf guard is made of a mesh screen.

The filtration system 2 may also include a secondary bio-filter 50. An exemplary embodiment of a secondary bio-filter 50 is shown in FIGS. 7A-7I. Water from the rotary drum filter 30 flows into the secondary bio-filter 50 through one or more connecting lines 302. The connecting line 302 can include a pump 312.

Like the primary bio-filter 40, the secondary bio-filter 50 can also provide a housing for filter media that allows bacteria to colonize in the filter to increase biofiltration of the system. However, the secondary bio-filter 50 may be set up with a different configuration than the primary bio-filter 40 to encourage growth of different types of bacteria and more oxygenation. In one embodiment, the secondary bio-filter 50 is a bakki shower. A bakki shower includes one or more through-flow boxes that can be stacked on top of one another to simulate water flow across and through a bed of rocks. Rather than being immersed in water as in the primary bio-filter 40, the filter media in the bakki shower is covered by a thin film of moving water. The filter media typically used in a bakki shower is a porous ceramic material that resembles highly porous rocks. Water is brought into the bakki shower through the top, where it can be dispersed and allowed to trickle through the bed of media. In some embodiments, the disclosed bakki shower system is a highly efficient filter that allows for a high oxygen transfer while minimizing typical shower splashing.

In one embodiment, the secondary bio-filter 50 is a bakki shower comprising two or more stacked filter housing units 51. Each filter housing unit 51 defines an interior space for housing media. In a stacked arrangement, only the bottom filter housing unit 51 has a closed bottom, whereas upper filter housing units 51 have an open bottom or a bottom with one or more openings to facilitate flow of water. The media can be supported on a perforated media tray 52 placed at the bottom of the filter housing unit 51. The filter housing unit 51 may further include a diffuser plate 53 placed at or near the top of the unit to disperse water. In the exemplary embodiment shown, the diffuser includes a first section 511 and a second section 512, where the first section 511 includes perforations (e.g., holes) distributed at a first density and the second section 512 includes perforations (e.g., holes) distributed at a second density, where the second density is greater than the first density. The first section 511 may extend from a first end of the diffuser plate 53 about ¼ to about ½ of the way toward the second end, and the second section 512 may extend from the end of the first section 511 to the second end.

Figure 7A:
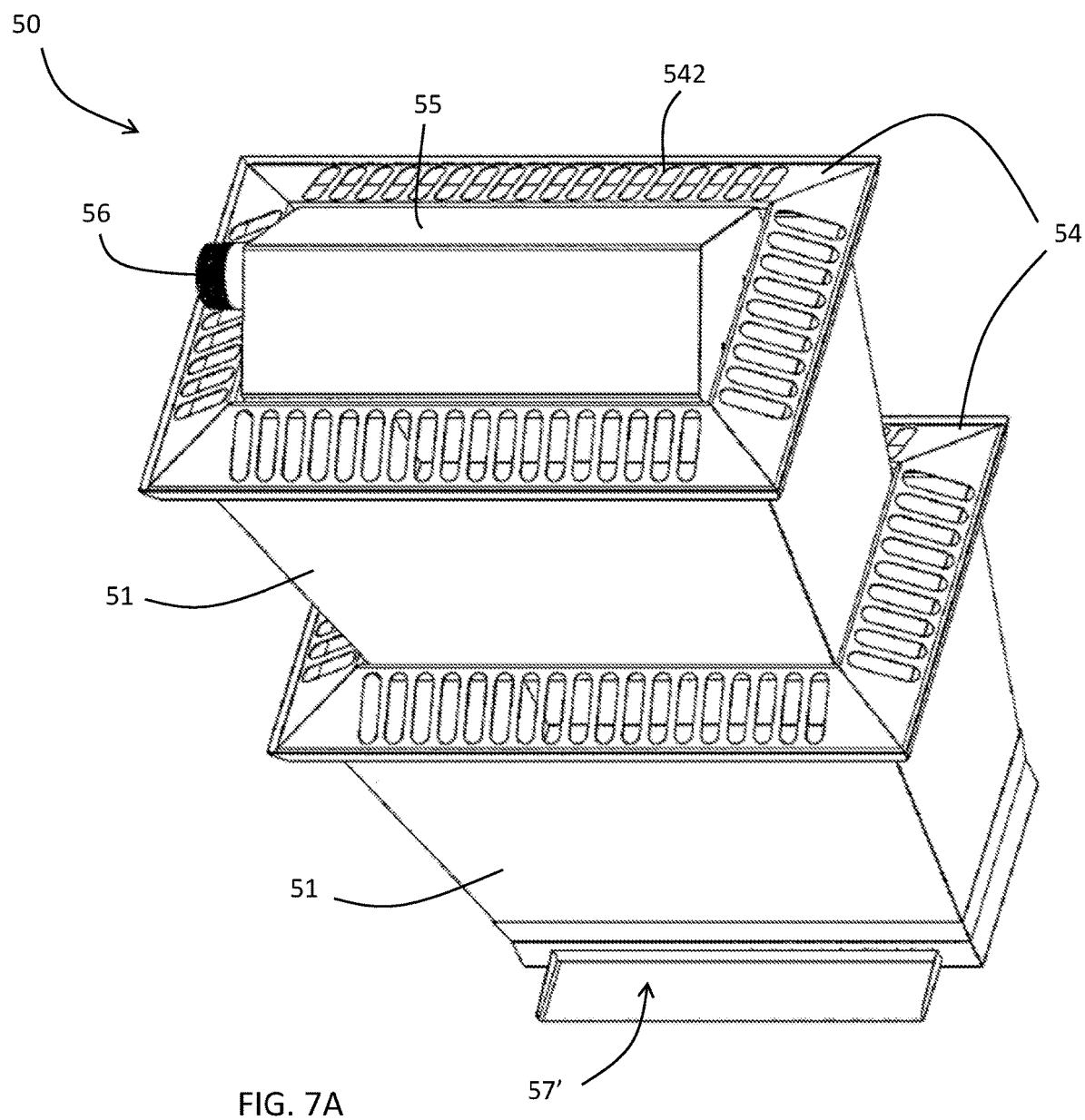
FIG. 7A is a perspective view of a bakki shower used in the system of FIG. 2 according to an embodiment.
Figure 7C:
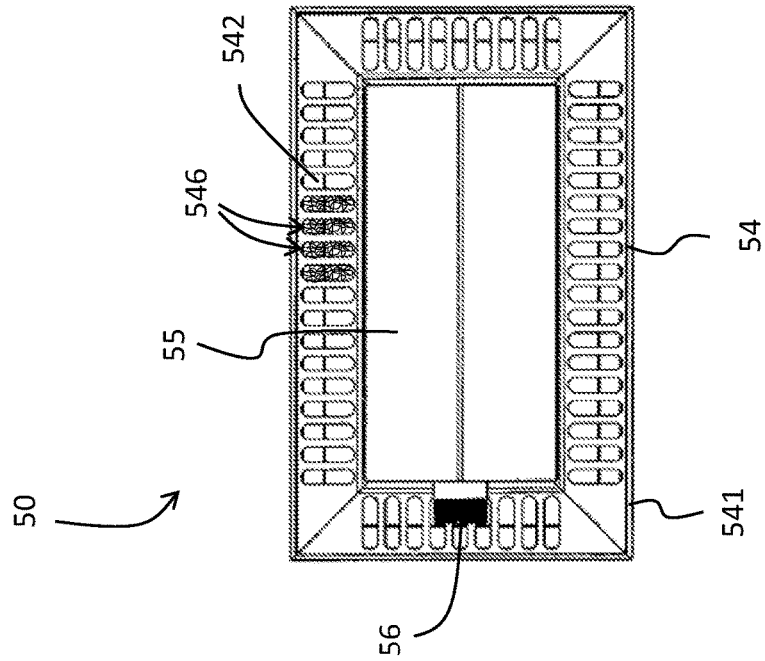
FIG. 7C is a top view of the bakki shower of FIG. 7A.
Figure 7B:
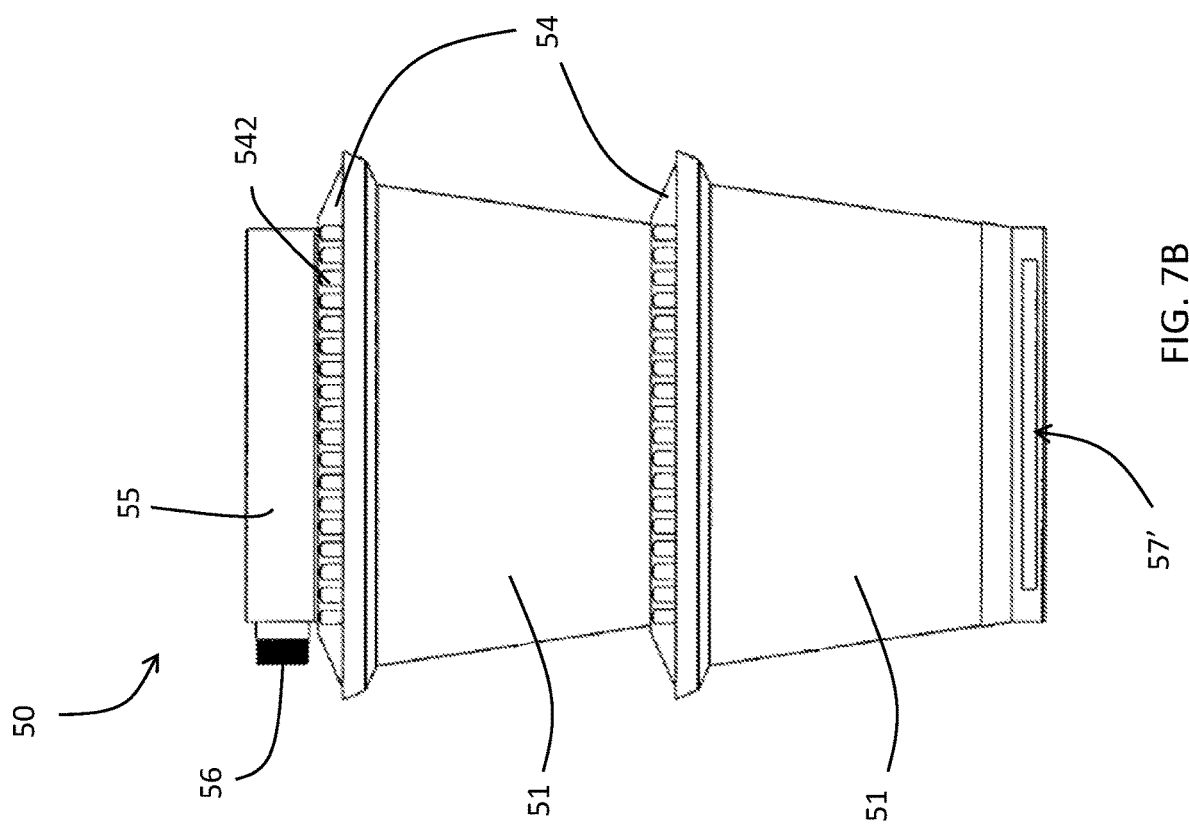
FIG. 7B is a side view of the bakki shower of FIG. 7A.
Figure 7D:
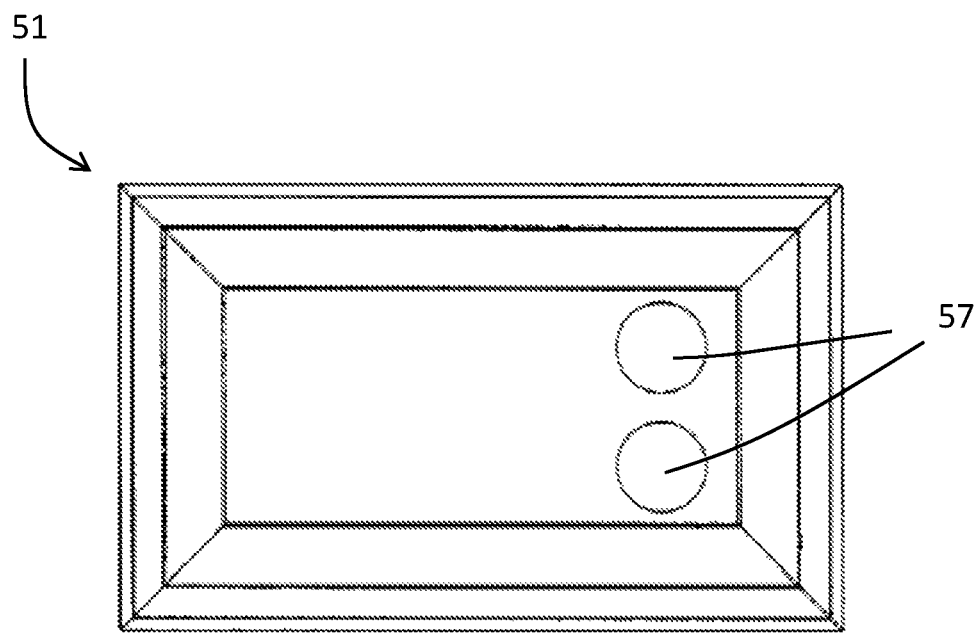
FIG. 7D is a top view of a housing unit of a bakki shower according to an embodiment.
Figure 7E:
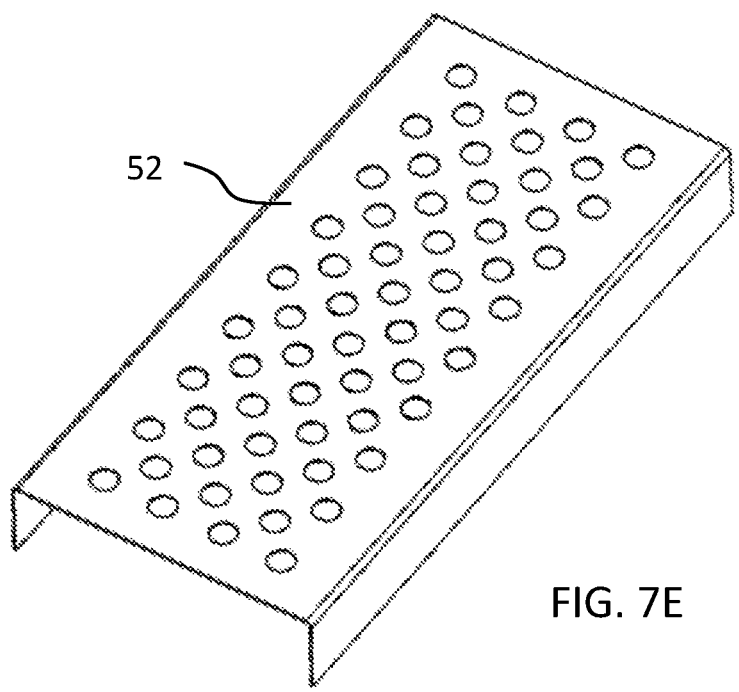
FIG. 7E is a perspective view of a media tray of the bakki shower of FIG. 7A.
Figure 7F:
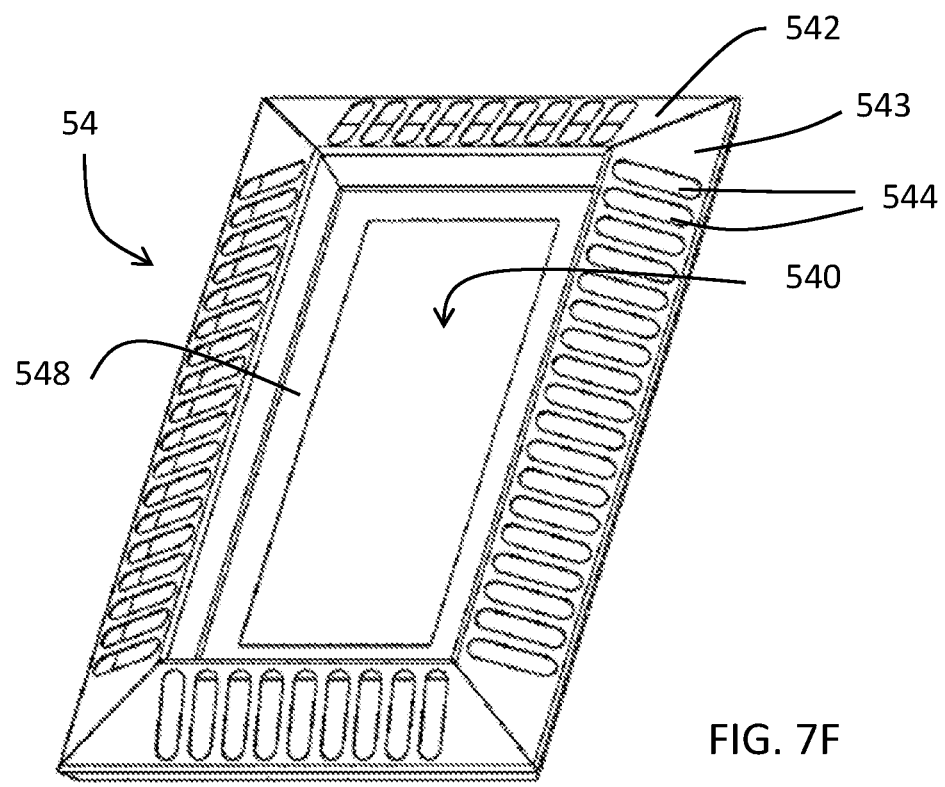
FIG. 7F is a perspective view of a skirt of the bakki shower of FIG. 7A.
Figure 7G:
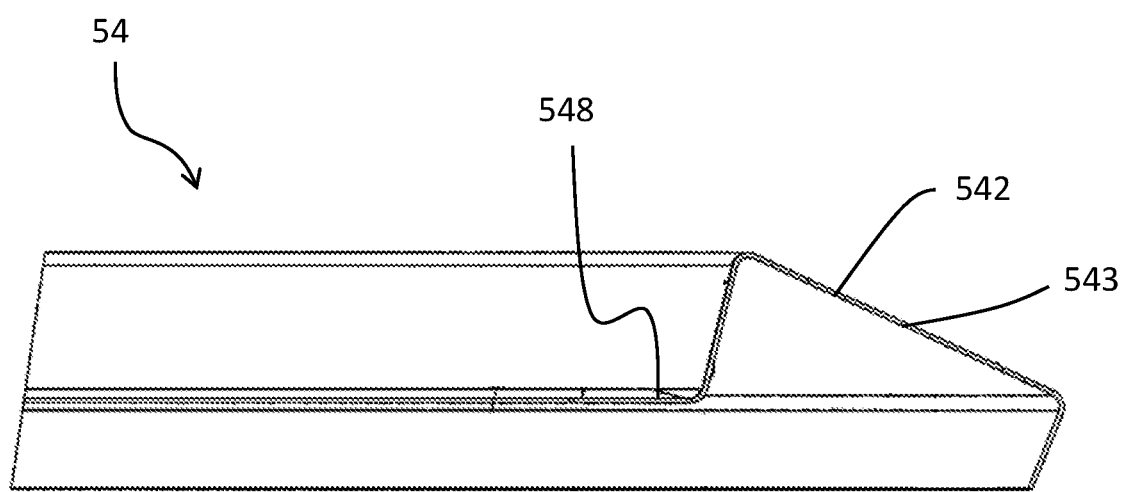
FIG. 7G is a partial cross sectional view of the skirt of FIG. 7F.

Each filter housing unit 51 may also include a skirt 54, shown in FIGS. 7C, 7F and 7G. The skirt 54 has a center opening 540 that is smaller in diameter than the outer perimeter 541 of the skirt. The skirt 54 defines a splash guard 542 and a support ledge 548 that surround the center opening 540. When filter housing units 51 are stacked, the upper filter housing unit 51 can be supported on the support ledge 548.

In an embodiment, the splash guard 542 comprises a slanted wall 543 that includes a plurality of openings 544. The openings may be shaped to minimize splashing of water from the filter. For example, the openings may be shaped as ovals, ellipsoids, rounded rectangles, or rectangles having a longitudinal axis extending outwardly from the center opening 540. In another embodiment, the filter housing unit 51 further includes a splash reducing material 546 that is placed under the openings 544 of the splash guard 542. For example, a splash reducing material 546, such as a highly porous polymeric filter material (for example MATALA® filter media available from Matala USA in Laguna Hills, Calif.), can be disposed on top of the diffuser and below the splash guard 542 along the walls of the filter housing unit 51.

The filter housing units may be covered by a roof assembly 55 (shown in FIGS. 7H and 7I) supported on the support ledge 548 of the skirt 54. The roof assembly 55 includes a roof 550 having slanted first and second roof portions 551, 552, and first and second end walls 553, 554. The roof assembly 55 includes a water inlet 56 at one of the end walls 553, 554. The roof assembly 55 functions to distribute the water flow into the bio-filter, and keeps sun light, which may promote algae growth, and rain fall away from the opening of the filter housing unit 51. The diffuser plate 53 may be coupled with the roof 550 to form the roof assembly 55. The diffuser plate 53 may include a flange 515 at the first and second ends of the diffuser plate 53 to facilitate coupling with the roof 550.

A typical bakki shower arrangement is provided with a water outlet at one of the sides of the bottom unit. The water outlet can be a simple opening or a pipe, or a water-fall type outlet (shown as 57 in FIGS. 7A and 7B). According to an embodiment, the bakki shower has one or more water outlets 57 at the bottom of the lower stacked filter housing unit 51. The bakki shower can be arranged on top of or above the primary bio-filter 40, and the flow of water from the bakki shower directed into the primary bio-filter 40. Flow from the bakki shower into the primary bio-filter 40 can be arranged as gravity flow. The primary bio-filter 40 has an input end 48 with one or more inlets 410, where the connecting line 301 brings water from the rotary drum filter 30, and an output end 49 with one or more outlets 47. The water from the secondary bio-filter 50 can be directed into the primary bio-filter 40 near the output end. For example, the outlet 57 of the bakki shower (secondary bio-filter 50) can be connected to an outlet line 570 that ends in the primary bio-filter 40 adjacent the wall 42 of the primary bio-filter 40.

In alternative embodiments, water may be returned from the bakki shower as a rain return in which the bakki shower is suspended over the water reservoir such that water supplied to the bakki shower can rain through the shower. Alternatively, the bakki shower may be set up as a waterfall return in which the bakki shower positioned adjacent to the water reservoir, allowing water to return from the bakki shower to the water reservoir through a water spillway.

The flow rate through the system is affected by multiple factors. Gravity flow can be adjusted by increasing or decreasing the difference in water levels between the water reservoir 10 and the components of the filtration system 2. For example, the water level in the collection box 20 can be maintained about 1 to about 6 inches, or about 2 to about 5 inches below the water level in the water reservoir 10. Flow rate is also affected by the size of the outlets, drains, piping, inlets, and the use of pumps. Features that cause turbulence in the water flow, such as barriers and corners in the lines will act to slow the flow rate. Minimizing such features will help increase flow rate in the system. The flow rate can also be increased by arranging a pressure return system for the filtration system 2 as shown in FIGS. 2 and 3. In a pressure return system, the flow from the rotary drum filter 30 is split between the primary and secondary bio-filters 40, 50, such that flow from the rotary drum filter 30 to the primary bio-filter 40 is by gravity flow, and a pump 312 is used in connecting line 302 to pump water into the secondary bio-filter. The water from the secondary bio-filter 50 is flown into the primary bio-filter 40 by gravity. The return line 401 includes a return pump 411 that is sized to control the turnover rate (e.g., filtration rate) of the system.

Referring now to FIGS. 9A-9C, an embodiment of the bottom drain 13 is shown. The bottom drain 13 may include a receiving portion 130 having a wall 131 that extends from a bottom 139 to a top edge 133. The wall 131 may be generally cylindrical in shape. The bottom drain 13 may include a slanted sub-floor 132 that facilitates flow of water into an outlet 135 positioned adjacent the lowest portion of the slanted sub-floor 132. The slanted sub-floor 132 may be set at a suitable angle $\alpha 132$ relative to the bottom 138, such as about 15 to about 50 degrees, about 20 to about 45 degrees, or about 25 to about 35 degrees. The bottom drain 13 can be mounted at the bottom 14 of the water reservoir 10 such that the top edge 133 of the receiving portion 130 is flush with the bottom 14. The top edge 133 may include a lip 134 that facilitates installation and placement of the bottom drain.

The outlet 135 may comprise a pipe section 136 protruding laterally outwardly from the wall 131. The pipe section 136 can be connected to the bottom intake 113. The receiving portion 130 may further include a lid mounting stub 137 that couples with a mounting post 141 of the lid 140. The lid mounting stub 137 may extend upwardly from the bottom 138 and protrudes through the slanted sub-floor 132, for example, from the center of the slanted sub-floor 132. The lid mounting stub 137 may include threading 138 for coupling with corresponding threading 142 on the mounting post 141 so that the mounting post 141 may be removed. In one example embodiment in which the mounting post 141 protrudes above the top edge 133, if the lid 140 is removed (e.g., for cleaning, maintenance, or other reasons), a top portion of the mounting post 141 may be exposed above the top edge 133. In such an example, removing the mounting post 141 by way of the threading 138 would avoid inadvertent damage that may be caused to the mounting post 141 or bottom drain 13. Alternatively, the mounting post 141 may be friction fitted onto the lid mounting stub 137.

The mounting stub 137 has a height H137, and the mounting post 141 has a height H141. In one embodiment, the height H137 of the mounting stub 137 is such that the top of the lid mounting stub 137 interjects the plane of the slanted sub-floor 132, or that no portion of the lid mounting stub 137 extends more than 4 inches, more than 3 inches, or more than 2.5 inches above the slanted sub-floor 132. The combined heights H137 and H41 are such that when the lid 140 is mounted on the receiving portion 130, a gap remains between the lid 140 and the wall 131 of the receiving portion 130.

The bottom drain 13 further provides an air flow path 146A defined by an air inlet 146 connected to the lid mounting stub 137; the hollow interior of the lid mounting stub 137; the lid mounting post 141; an opening in the lid; and a porous rubber membrane 145 placed at the top of the lid 140. The air inlet 146 can be disposed below the slanted sub-floor 132 and protrude through the wall 131, connecting to an air supply. The air inlet 146 may extend outwardly at an angle $\beta 130$ from the center of the bottom drain 13 (e.g., from the lid mounting stub 137) relative to the outlet 136, as shown in FIG. 9C. The angle may be about 80 to about 180 degrees, or about 90 to about 130 degrees.

While certain embodiments have been described, other embodiments may exist. While the specification includes a detailed description, the scope of the present disclosure is indicated by the following claims. The specific features and acts described above are disclosed as illustrative aspects and embodiments. Various other aspects, embodiments, modifications, and equivalents thereof which, after reading the description herein, may suggest themselves to one of ordinary skill in the art without departing from the spirit of the present disclosure or the scope of the claimed subject matter.

What is claimed is:

1. A freshwater treatment system for an outdoor open freshwater pond, the system comprising:
    a rotary drum filter arranged and configured to be remote from an outdoor open freshwater pond, the rotary drum filter arranged to receive flow of freshwater from the outdoor open freshwater pond from a receiving line;
    a primary bio-filter configured to receive freshwater from the rotary drum filter and to remove organic matter from freshwater;
    one or more connecting lines originating at the rotary drum filter and connected to the primary bio-filter, wherein gravity causes freshwater to flow through the one or more connecting lines from the rotary drum filter to the primary bio-filter;
    one or more return lines connecting the primary bio-filter and the outdoor open freshwater pond; and
    a return pump in fluid communication with the one or more return lines, wherein the return pump is positioned downstream of the primary bio-filter and is configured to cause a pressurized return of freshwater from the primary bio-filter back to the outdoor open freshwater pond through the one or more return lines.

2. The freshwater treatment system of claim 1, wherein the primary bio-filter comprises a housing with an inlet end and an outlet end, the housing defining an interior space.

3. The freshwater treatment system of claim 1, wherein the primary bio-filter further comprises a filter-media housing.

4. The freshwater treatment system of claim 1, wherein gravity causes water to flow from the outdoor open freshwater pond to the rotary drum filter.

5. The freshwater treatment system of claim 1, further comprising a pump that pumps the water from the outdoor open freshwater pond to the receiving line of the rotary drum filter.

6. The freshwater treatment system of claim 1, further comprising:
a secondary bio-filter, wherein the one or more connecting lines originating at the rotary drum filter comprise a second outlet line connected to the secondary bio-filter, the second outlet line comprising a pump.

7. The freshwater treatment system of claim 1, wherein the return pump is in direct fluid communication with the outdoor open freshwater pond through the one or more return lines.

8. The freshwater treatment system of claim 1, wherein the return pump is in direct fluid communication with the primary bio-filter.

9. The freshwater treatment system of claim 1, wherein the return pump is the only pump configured to recirculate freshwater in the system.

10. The freshwater treatment system of claim 1, wherein the primary bio-filter comprises aerobic filter media.

11. The freshwater treatment system of claim 1, wherein the primary bio-filter is outfitted with an aeration system to provide oxygen into the primary bio-filter.

12. The freshwater treatment system of claim 11, wherein the aeration system comprises an aeration pump and one or more air diffusers at the bottom of the primary bio-filter.

13. A freshwater treatment system for an outdoor open freshwater pond, the system comprising:
a rotary drum filter arranged and configured to be remote from an outdoor open freshwater pond, the rotary drum filter arranged to receive flow of freshwater from the outdoor open freshwater pond from a receiving line;
a primary bio-filter configured to receive freshwater flowing from the rotary drum filter and to remove organic matter from the freshwater;
a secondary bio-filter;
one or more connecting lines originating at the rotary drum filter and comprising at least a first outlet line connected to the primary bio-filter and a second outlet line connected to the secondary bio-filter, the second outlet line comprising a pump configured to pump freshwater from the rotary drum filter to the second bio-filter;
a return line originating at the primary bio-filter and terminating at the outdoor open freshwater pond; and
a return pump configured to cause a pressurized return of freshwater from the primary bio-filter back to the outdoor open freshwater pond through the return line,
wherein gravity causes freshwater to flow from the rotary drum filter to the primary bio-filter through the first outlet line,
wherein gravity causes freshwater to flow from the secondary bio-filter into the primary bio-filter.

14. The freshwater treatment system of claim 13, wherein the rotary drum filter receives gravity flow from the outdoor open freshwater pond.

15. The freshwater treatment system of claim 13, further comprising a pump that pumps the freshwater from the outdoor open freshwater pond to the receiving line of the rotary drum filter.

16. The freshwater treatment system of claim 13, wherein the secondary bio-filter is positioned above and in gravity flow communication with the primary bio-filter.

17. The freshwater treatment system of claim 13, wherein the primary bio-filter comprises a housing with an inlet end and an outlet end, the housing defining an interior space, wherein the secondary bio-filter comprises an outlet line terminating adjacent the outlet end of the primary bio-filter.

18. The freshwater treatment system of claim 13, wherein the secondary bio-filter is a bakki shower type of filter comprising one or more stacked filter housing units.

19. A method of freshwater treatment for an outdoor open freshwater pond, the method comprising:
receiving freshwater through a receiving line at a rotary drum filter by flow from the outdoor open freshwater pond, wherein the rotary drum filter is arranged and configured to be remote from the outdoor open freshwater pond;
filtering the freshwater with the rotary drum filter;
passing by gravity the freshwater from the rotary drum filter to a primary bio-filter using one or more connecting lines;
filtering the freshwater using the primary bio-filter to remove organic matter from the freshwater; and
causing a pressurized return of the freshwater from the primary bio-filter to the outdoor open freshwater pond through a return line using a return pump in fluid communication with the return line, wherein the return pump is in direct fluid communication with the outdoor open freshwater pond through the return line.

20. The method of claim 19, wherein the rotary drum filter receives the freshwater by gravity flow from the outdoor open freshwater pond.

21. The method of claim 19, further comprising pumping the freshwater from the outdoor open freshwater pond to the rotary drum filter.

22. The method of claim 19, wherein filtering the water with the primary bio-filter comprises passing the freshwater through an interior space of a housing from an inlet end to an outlet end.

23. The method of claim 19, wherein the primary bio-filter further comprises a filter-media housing containing a filter media, and wherein filtering the freshwater using the primary bio-filter comprises passing the freshwater through the filter media.

24. The method of claim 23, wherein the filter media comprises a semi-buoyant polyethylene media.

25. The method of claim 19, further comprising:
pumping at least some of the freshwater from the rotary drum filter to a secondary bio-filter;
filtering the freshwater using the secondary bio-filter; and
causing the freshwater to flow from the secondary bio-filter into the primary-biofilter by gravity.

* * * * *